J. L. WILD.
ART OF COOKING HAMS.
APPLICATION FILED MAY 6, 1915.
1,214,627.
Patented Feb. 6, 1917.
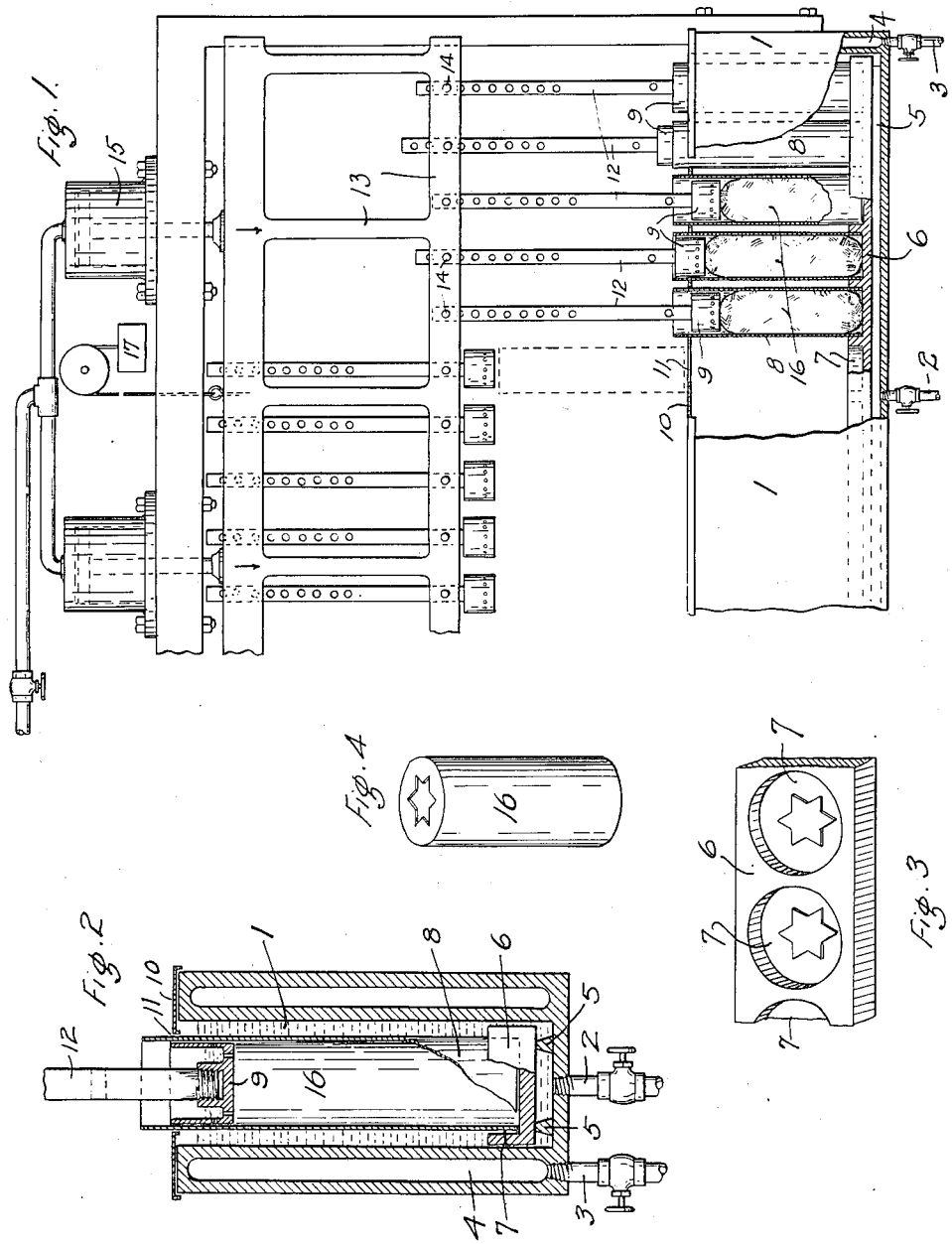
Witness
Clare Moffitt.
Inventor
Joseph L. Wild
By R. L. Elliott
Attorney

UNITED STATES PATENT OFFICE.

JOSEPH L. WILD, OF TACOMA, WASHINGTON, ASSIGNOR OF ONE-HALF TO SIDNEY MacSWEEN, OF TACOMA, WASHINGTON.

ART OF COOKING HAMS.

1,214,627.  Specification of Letters Patent.  Patented Feb. 6, 1917.

Application filed May 6, 1915. Serial No. 26,393.

*To all whom it may concern:*

Be it known that I, JOSEPH L. WILD, a citizen of the United States, residing at Tacoma, in the county of Pierce, State of Washington, have invented certain new and useful Improvements in the Art of Cooking Hams, of which the following is a specification.

This invention relates to the art of cooking hams and other meats and has for its objects to produce a cooked ham of uniform section throughout its length thus eliminating the waste usually occasioned by the irregular form of the ends of the boiled ham; to retain within the ham substantially all of the constitutents thereof thereby preventing the loss of weight which always occurs when the ham is boiled in the usual way; to treat the ham so that it retains its shape without tying or wrapping; to impress the trade-mark, name, or other device into the ends of the ham while it is cooking; and to collect the jelly from the ham.

Further objects are to provide means wherein many hams may be simultaneously cooked; means to apply substantially equal pressures to all the hams; and to enable the apparatus to be taken apart for washing and cleaning purposes.

I attain these and other objects by the devices, mechanisms, arrangements, apparatus, and actions hereinafter described and illustrated in the accompanying drawings, in which—

Figure 1 is a front elevation of a portion of a battery of my improved ham-cooking apparatus, showing parts broken away to reveal the interior and showing a few of the charged cookers in place in the tank before pressure has been applied thereto; Fig. 2 is a cross-section of the tank and cooker during the cooking and when pressure has been applied to the ham; Fig. 3 is a perspective view of the bottom plate of the cooker; and Fig 4 is a perspective view of the finished ham.

Similar numerals of reference refer to similar parts throughout the several views.

When meat is boiled in direct contact with water in the usual way a large quantity of its substance is cooked out and is carried away in the water. Also when boned hams are boiled free in water they have to be tied or covered so as to retain their general shape, and their ends are always of odd shapes and are substantially unusual and therefore further add to their wastage. In order to overcome these disadvantages I have devised the hereinafter described process for cooking of hams and the apparatus for carrying out the process.

In general, it may be stated that my improved process of cooking hams consists in cooking them under mechanical pressure under the influence of heat but without contact with water, and that the apparatus wherein this process is carried out consists in containers immersed in boiling water and wherein the hams are placed under mechanical pressure.

Referring to the drawings in which one form of the apparatus for carrying out my process is illustrated, it will be seen that a tank 1 is provided, adapted to receive the boiling water through the supply and drain pipe 2, said tank being preferably heated by means of live steam from the steam pipe 3 which leads to the steam-jacket spaces 4 around the sides of the tank 1. A pair of supporting bars 5 are placed on the bottom of the tank 1. These bars 5 may be formed integral with the bottom of the tank or may be inserted therein and removable therefrom. A heavy bottom plate 6 rests on the bars 5 and is held above the bottom of the tank 1 thereby. This plate 6 has a number of recesses 7 in its upper side, each such recess being adapted to receive the lower end of a container. Said recesses 7 may have the trade-mark or other device, which it is desired to impress on the end of the ham, thereon. The containers 8 consist of a hollow open-ended receptacle of uniform cross-section. These are preferably made cylindrical, but they may be of any other desired section, as, for instance, triangular, square, hexagonal, etc. Each container 8 is provided with a piston or pressure head 9 which fits therein and is formed substantially as shown in the drawings, having a cup-shaped upper side with small holes made in its sides and bottom, thus forming a cup into which the jelly from the cooking meat is forced and collected. A cover 10 fits over the tank 1 and has holes 11 therein, corresponding in position with the recesses 7 in the plate 6, through which the said cylinders or containers 8 pass.

Pressure may be applied to each piston or pressure head 9 separately by means of weights, springs or other devices, or it may be applied to all the said pistons 9 in substantially equal degree. One method by which this may be accomplished is illustrated in Fig. 1, in which each piston 9 is provided with a rod 12 secured thereto by suitable means, each such rod being adapted to be secured in adjustable position to a vertically sliding frame 13 by means of pins 14 or other suitable devices. The frame 13 may be pressed down by means of weights or by steam or hydraulic pressure applied to pistons within the cylinders 15. Since the hams 16 are of varying sizes the pistons 9 will occupy different positions in the containers 8 and the rods 12 will therefore be secured to the frame 13 at different points, as shown, but the pressure on each piston 9, when the frame 13 moves downward under the action of the pressure in the cylinders 15, or otherwise, will be substantially equal on each ham 16. The mechanical pressure thus applied to the end of a ham will place the entire ham under compressive strain so that when it is heated in the cooking its structure is somewhat rearranged. A counterweight 17 may be secured in the usual way to the frame 13 if desired.

My process is carried out in the following manner: The ham 16 is first prepared and forced, by suitable means, into the lower end of a container 8. The container is then inserted through the hole 11 into the tank 1 and rests in the recess 7 of the plate 6. Then the piston 9 is lowered and brought into contact with the top end of the ham 16. When all the containers are thus inserted into place in the tank 1, and their pistons are each in contact with the respective hams and are secured to the frame 13, then pressure is applied thereto through the cylinders 15. Hot water is then admitted into the tank 1 through the pipe 2, to surround all the containers 8, and then live steam is admitted into the jacket spaces 4 through the pipe 3. The heat thus applied to the outside of the container 8 cooks the ham, causing its juices to enter the cup of the piston 9 where they are collected and from whence they are later partially reabsorbed by the ham as it cools. The pressure on the ham prevents any water from entering the container around its lower end. The structure of the ham is rearranged during the cooking by the heat and the mechanical pressure thereon, so that its ends are flattened between the piston 9 and the lower side of the recess 7 into planes at right-angles to the axis of the cylinder or container 8, and any devices formed on the said surfaces will be impressed into the ends of the ham, and further, the said ham will retain its shape and form after removal from the container without any binding string or other wrapping means. It is evident that a great variety of apparatus may be designed to carry out this process of cooking, the above having been described simply to indicate one such apparatus. It is also evident that the entire apparatus as shown and described, may be taken apart and cleaned and is therefore a highly sanitary mechanism.

Having described my invention, what I claim is:

1. In an apparatus for cooking meats, the combination with a tank containing heat conveying means; a cover to said tank, and having a hole therethrough; an open-ended meat container within the tank and extending through the hole in the cover; a piston in the open end of said meat container; and means whereby a pressure may be applied to said piston.

2. In an apparatus for cooking meats, the combination with a tank containing heat conveying means; a cover to said tank, and having a hole therethrough; an open-ended meat container within the tank and extending through the hole in the cover; a cup-shaped piston having holes therein communicating with the interior of the meat container, and adapted to receive, collect and partially restore the meat juices during cooking; and means whereby a pressure may be applied to the piston.

3. In an apparatus for cooking meats, the combination with a tank containing heat conveying means; an open-ended meat container partially immersed in said heat conveying means but having its open end free therefrom; a piston in said open end of said container; and means whereby a pressure may be applied to the piston.

4. In an apparatus for cooking meats, the combination with a tank containing heat conveying means; a cover to said tank having a plurality of holes therethrough; a plurality of open-ended meat containers within the tank and each extending through a hole in the cover; a piston in the open end of each one of said meat containers; and means whereby equal pressure may be simultaneously applied to each of said pistons.

5. In an apparatus for cooking meats, the combination with a tank containing heat conveying means; a cover to said tank having a plurality of holes therethrough; a plurality of open-ended meat containers within the tank and each extending through a hole in the cover; a piston in the open end of each one of said meat containers; pressure means; and individually adjustable connecting means joining each piston to said pressure means whereby equal pressure may be simultaneously applied to each of said pistons.

JOSEPH L. WILD.